No. 862,851. PATENTED AUG. 6, 1907.
G. G. SCHROEDER.
HOT WATER HEATER.
APPLICATION FILED NOV. 27, 1906.

4 SHEETS—SHEET 2.

Inventor
George G. Schroeder

Witnesses

By
Attorney

No. 862,851. PATENTED AUG. 6, 1907.
G. G. SCHROEDER.
HOT WATER HEATER.
APPLICATION FILED NOV. 27, 1906.

4 SHEETS—SHEET 3.

Witnesses
Berlin Brown
F. Siebschutz

Inventor
George G. Schroeder

By
Wm. D. Hodges
Attorney

No. 862,851. PATENTED AUG. 6, 1907.
G. G. SCHROEDER.
HOT WATER HEATER.
APPLICATION FILED NOV. 27, 1906.
4 SHEETS—SHEET 4.
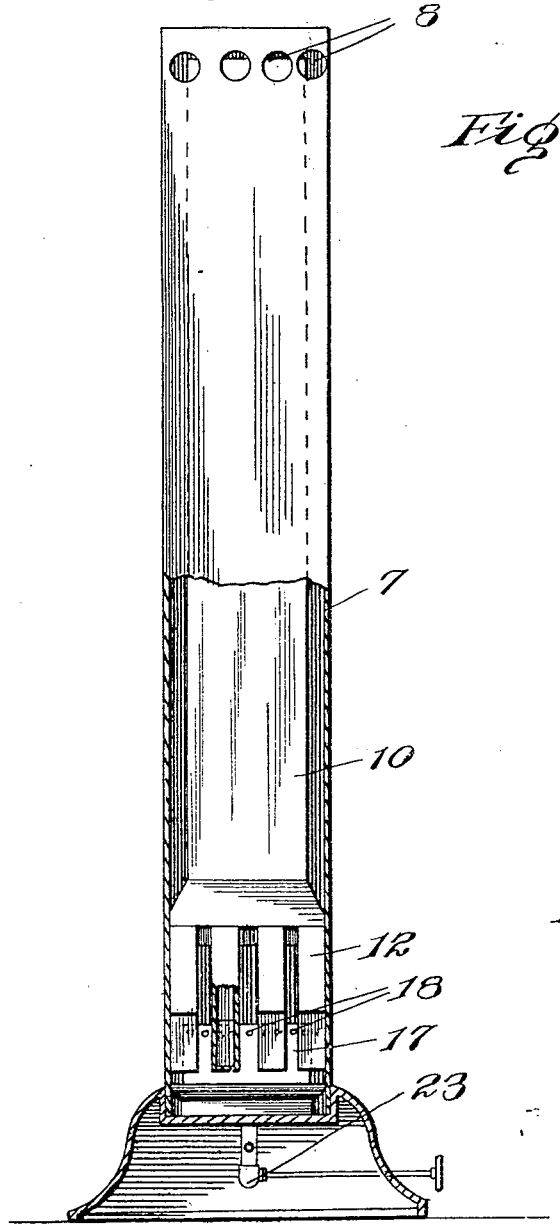
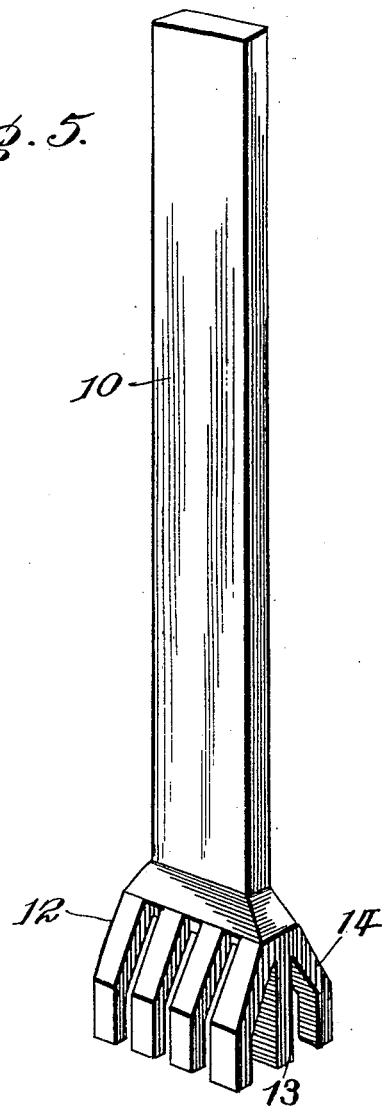
Witnesses
Berlie Braun
F. Siebschutz
Inventor
George G. Schroeder
By Wm. P. Hodges.
Attorney

UNITED STATES PATENT OFFICE.

GEORGE G. SCHROEDER, OF WASHINGTON, DISTRICT OF COLUMBIA, ASSIGNOR TO INDUSTRIAL ALCOHOL HEAT AND LIGHT COMPANY, A CORPORATION OF SOUTH DAKOTA.

HOT-WATER HEATER.

No. 862,851.  Specification of Letters Patent.  Patented Aug. 6, 1907.

Application filed November 27, 1906. Serial No. 345,313.

*To all whom it may concern:*

Be it known that I, GEORGE G. SCHROEDER, a citizen of the United States, residing at Washington, in the District of Columbia, have invented certain new and useful Improvements in Hot-Water Heaters, of which the following is a specification.

This invention has relation to hot water heaters; and it consists in the novel construction and arrangement of its parts as hereinafter shown and described.

The object of the invention is to provide a heater of the character indicated which is adapted to use denatured alcohol as a fuel for heating a column of water. A series of radiator columns are connected with the said heated column, and through the latter the water when it is heated circulates. The heated column is housed within a suitable casing which also constitutes a chimney for the heating burner. The said burner is located below the heated column and is connected by a supply pipe with a reservoir tank. The said supply pipe is carried between the water circulating columns in order that the fuel may be warm when it is delivered to the burner.

The burner is of special construction, and is provided with means for gasifying the fuel and mixing the same with atmospheric air. A starting burner is also provided. Said starting burner surrounds the main burner and may be readily turned off when the parts have become sufficiently heated to gasify the liquid fuel.

Figure 1:
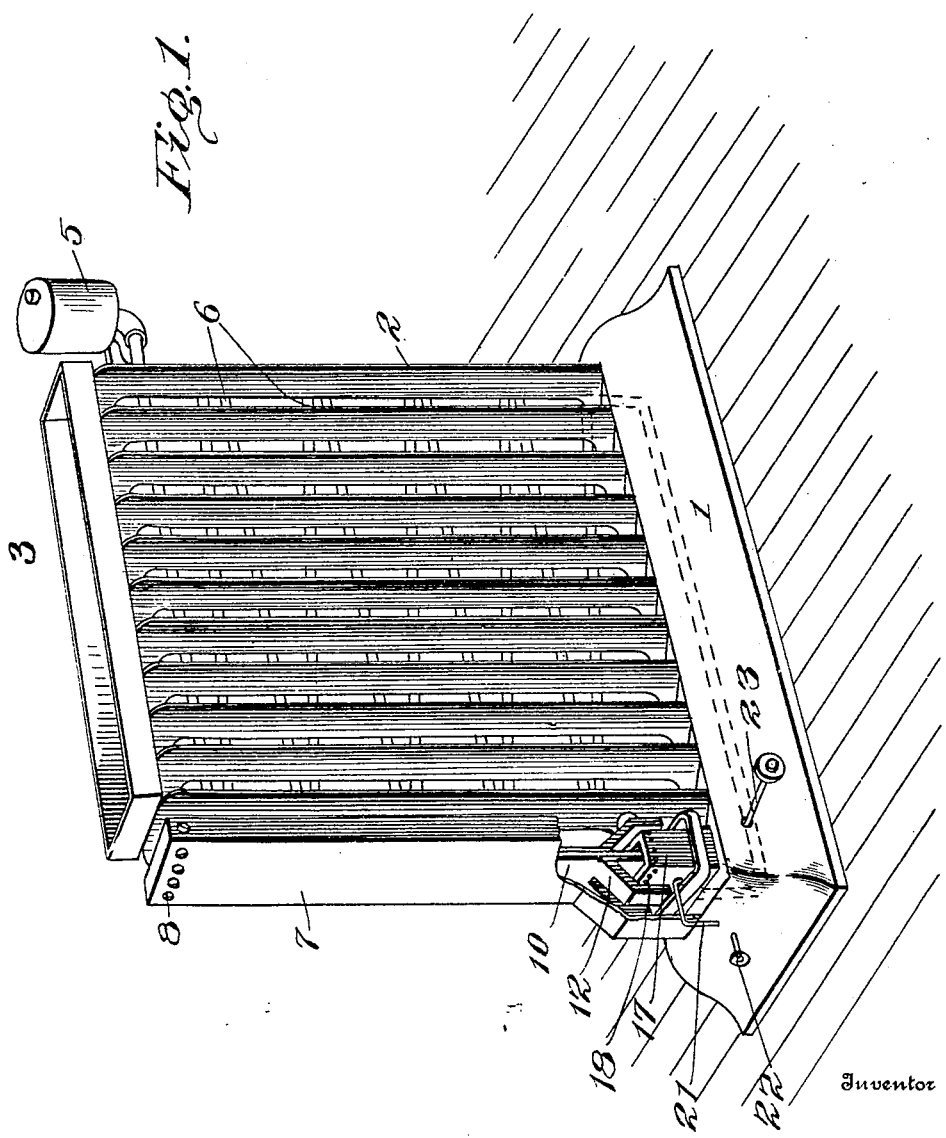
Figure 2:
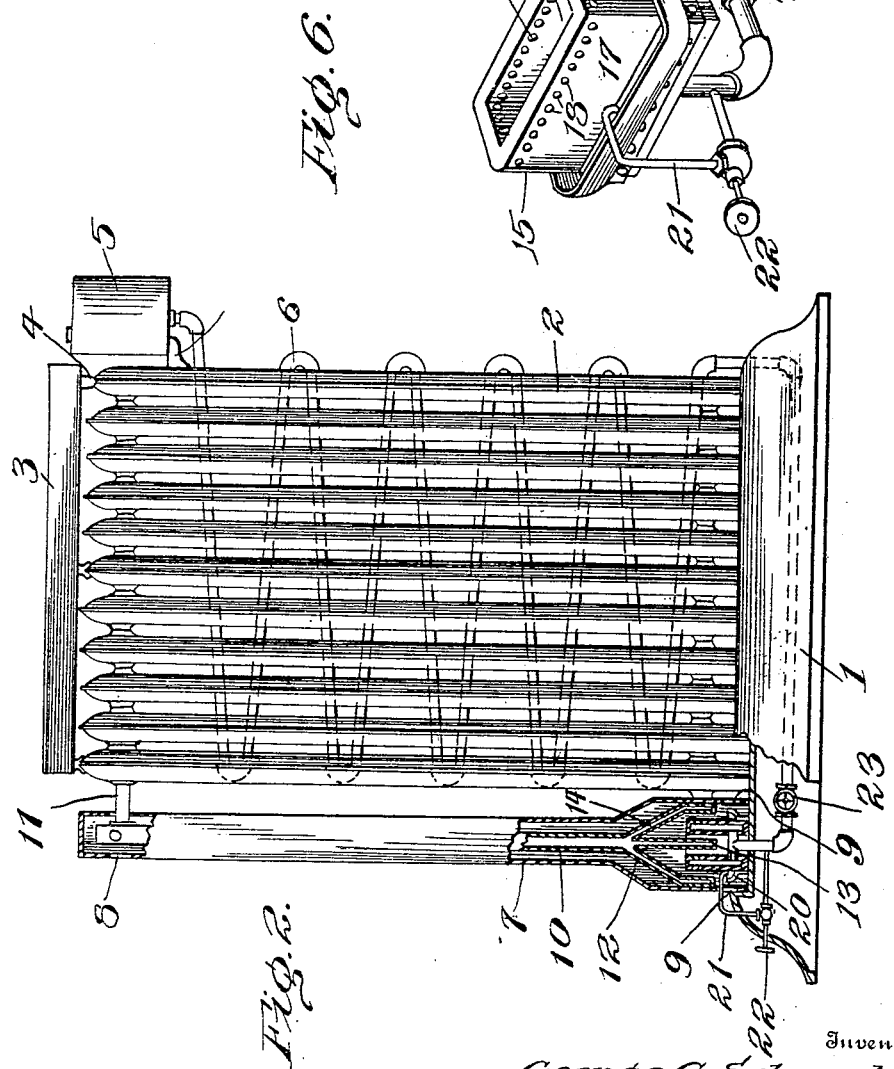
Figure 3:
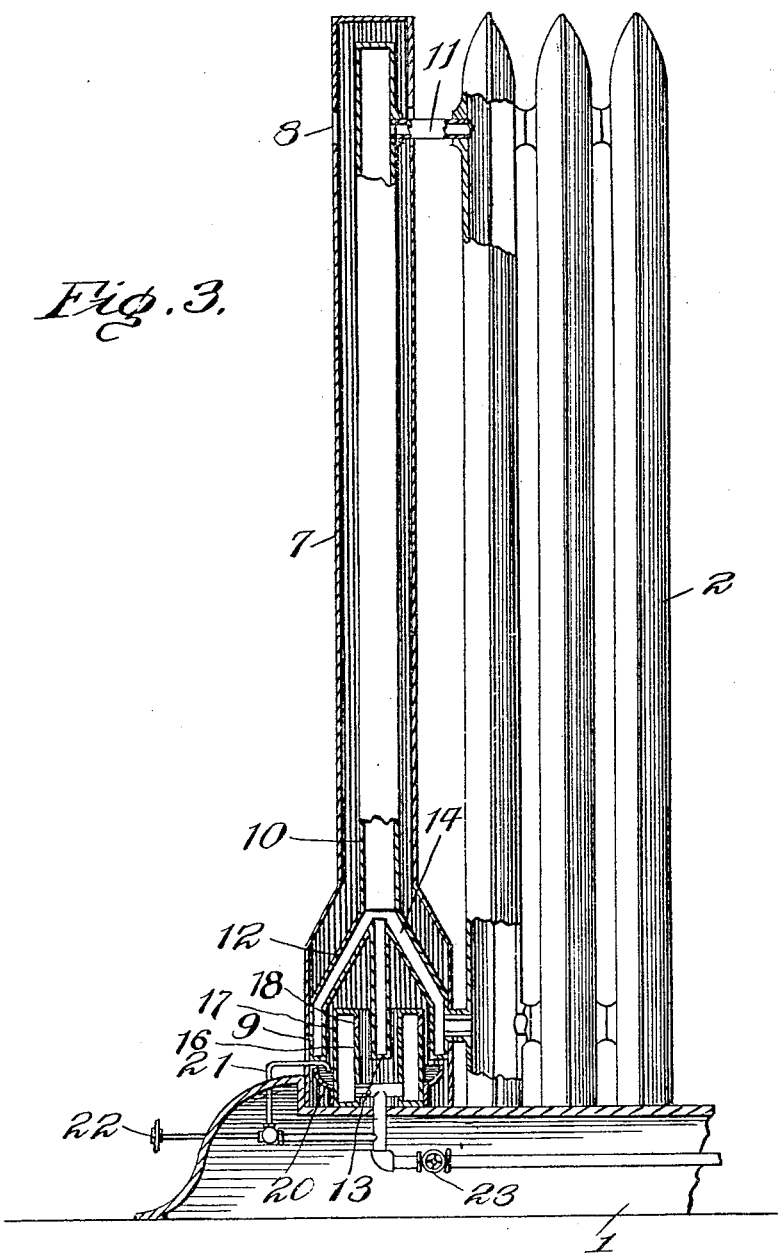

In the accompanying drawings:—Figure 1, is a perspective view of the heater applied to a radiator. Fig. 2, is a side elevation of the same with parts in section. Fig. 3, is an enlarged vertical sectional view of the heater attached to a radiator. Fig. 4, is a side elevation of the heater with the lower part thereof in section. Fig. 5, is a perspective view of the heated water column detached, and Fig. 6, is a perspective view of the burner.

The heater comprises the base 1, which supports the radiator columns 2, 2. The water tank or trough 3, is located above the columns 2, and is connected with the end column by a nipple 4. The fuel supply tank 5 is attached to the heater, and to its lower portion is attached the upper end of the fuel pipe 6, said pipe 6 being coiled or carried about the heating zone of the columns 2. The said pipe then passes through the top of the base 1, and extends under the same. The hood or chimney 7, is also located upon the base 1, and is provided at or near its upper end with an outlet opening 8, and at or near its lower end with the air inlet openings 9, 9. The column 10, is located within the hood 7, and is adapted to retain a column of water. The upper end of the column 10, is connected by a nipple 11, with the radiator columns 2. The lower end of the column 10, is provided with the branches 12, 13, and 14. The branches 14, are connected with the lower portions of the radiator columns 2, 2.

The burner 15, comprises the inner casing 16, and the outer casing 17, which are spaced apart. The upper vertical sides of the said casings are provided with the mixture outlet openings 18, while the lower portions of the said casings are provided with the air inlet opening 19. The fuel supply pipe 6, communicates with the space between the inner and outer burner casings 16, and 17.

The starting pan 20, is located about the outer burner casing 17, and the reduced pipe 21, terminates at one end over the said starting pan and connects at its other end with the fuel pipe 6. The needle valve 22, controls the passage of fuel through the pipe 21, while the needle valve 23 controls the passage of fuel through the pipe 6.

The operation of the heater is as follows:—The valve 22 is first opened and fuel is permitted to flow through the pipe 21 into the starting pan 20. This fuel is then ignited and the resultant flame completely envelops the burner casings 16, and 17, and the lower portion of the water retaining column 10. When the parts are sufficiently heated the valve 23, is opened and the fuel flows into the space between the inner and outer burner casings 16, and 17. As the fuel comes in contact with the surfaces of the heated parts, it is gasified and mixes with air which comes in through the openings 9, in the hood 7, and the openings 19, 19, in the inner and outer burner casings. This mixture then passes to the upper portion of the space between the inner and outer burner casings and passes out through the mixture outlets 18. This mixture is then ignited and keeps the said parts hot, and at the same time the flame will pass up the chimney or hood 7, and heat the water contained in the column 10. As this water becomes heated it begins to move in accordance with the laws governing a heated body of water fed by a cooler supply, and the circulation thus created is carried through the radiator columns 6. Thus the last said columns are kept constantly supplied with heated water and give out an admirable radiation for warming purposes.

It will thus be seen that a unit heater is provided, and in order to operate the same it is not necessary to attach any of the parts to permanent connections, as each unit has its own burner and fuel supply means. Thus the unit may be moved at will to any part of a room, and when not in use may be removed entirely from the room for storage purposes, all of which may be accomplished in an easy and speedy manner.

Having described my invention, what I claim as new and desire to secure by Letters Patent is:—

1. A heater of the character described comprising a casing forming a water column and provided with an inlet and an outlet, said casing having its lower end divided into central and lateral branches, in combination with a burner having an inclosed heating space receiving said central branch, said lateral branches embracing the outer walls of said burner.

2. A heater of the character described comprising a casing forming a water column and provided with an inlet and an outlet, said casing having its lower end divided into central and lateral branches, a burner having an inclosed heating space receiving said central branch, said lateral branches embracing the outer walls of said burner, and a hood inclosing said water column and burner.

3. A heater of the character described comprising a casing forming a water column and provided with an inlet and an outlet, the lower end of said casing being bifurcated and provided with a central depending portion, and a burner having an inclosed heating space receiving said depending portion, said bifurcated portion embracing the outer walls of said burner.

4. A heater of the character described comprising a casing forming a water column and provided with an inlet and an outlet, the lower end of said casing being enlarged and provided with central and lateral branches, and a burner having an inclosed heating space receiving said central branch, said lateral branches embracing the outer walls of said burner.

5. A heater of the character described comprising a casing forming a water column and provided with an inlet and an outlet, the sides of said casing at the lower end thereof being flared, said lower end being also provided with a plurality of centrally located depending branches, and a burner located beneath the flared side walls of said casing and provided with a heating chamber surrounding said central branches.

6. A heater of the character described comprising a casing forming a water column and provided with an inlet and an outlet, the sides of said casing at the lower end thereof being flared, the flared portions being each divided to form a plurality of attenuated lateral branches, said lower end being also provided with a central depending portion, and a burner located beneath the lateral branches and provided with a heating chamber surrounding said central portion.

7. A heater of the character described comprising a casing forming a water column and provided with an inlet and an outlet, the sides of said casing at the lower end thereof being flared, the flared portions being each divided to form a plurality of attenuated lateral branches, said lower end being also provided with a plurality of longitudinally arranged central branches, and a burner located beneath the lateral branches and provided with a heating chamber surrounding said central branches.

8. A heater of the character described comprising a casing forming a water column and provided with an inlet and an outlet, said casing having its lower end divided into central and lateral branches, said lateral branches being inclined outwardly and then extended downwardly parallel with the central branches, and a burner located in the space between the parallel portions of the central and lateral branches and provided with an inclosed heating space surrounding the central branches.

9. The combination with a radiator formed of a plurality of water columns, a base or support therefor, a casing supported by said base and forming a water column having inlet and outlet openings communicating with said radiator, the lower end of said casing being divided into central and lateral branches, a burner supported by said base and provided with a heating chamber surrounding said central branches, and a hood supported by said base and surrounding said casing and heating means.

In testimony whereof I affix my signature, in presence of two witnesses.

GEORGE G. SCHROEDER.

Witnesses:
WM. S. HODGES,
JAMES B. NICHOLSON.